Aug. 5, 1941.  W. W. PATRICK ET AL  2,251,341
MOLDBOARD FOR PLOWS AND METHOD OF MAKING SAME
Filed Jan. 14, 1939  2 Sheets—Sheet 1
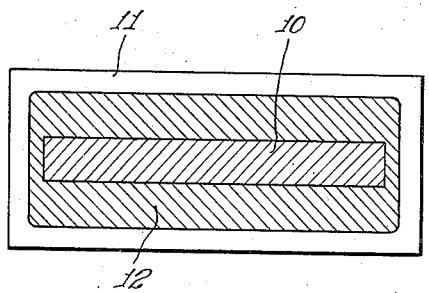
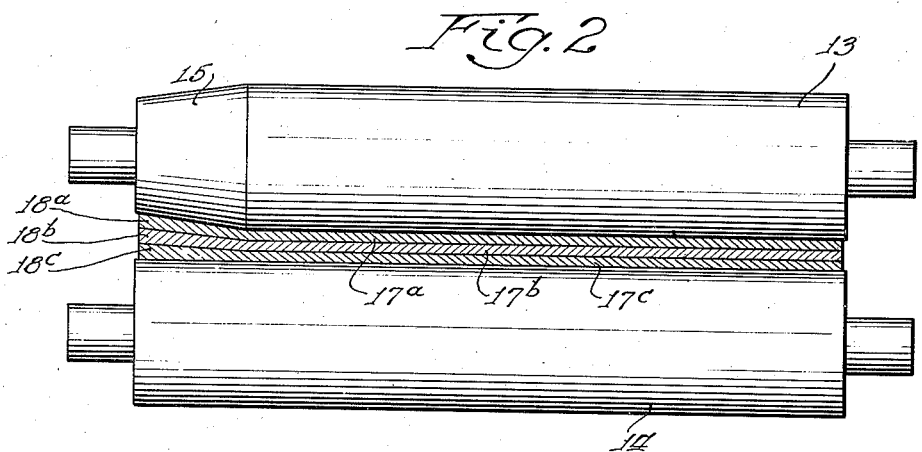
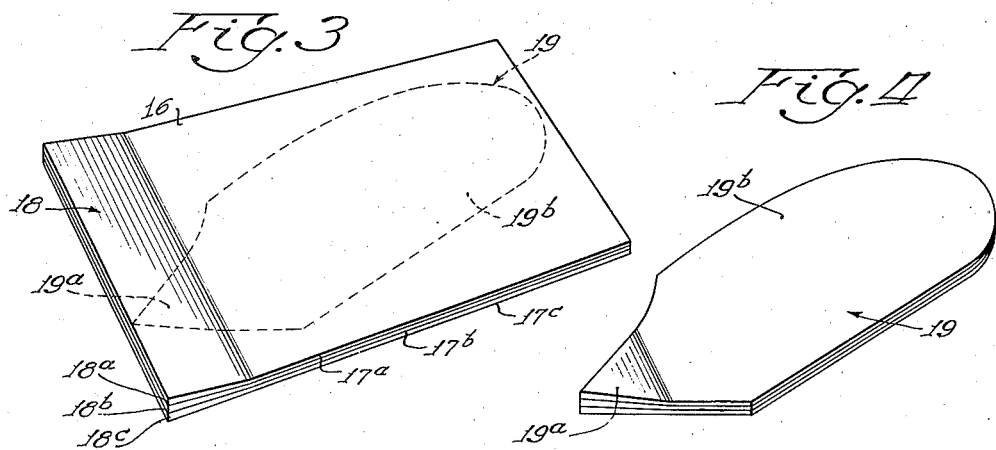
Inventors:
Wilbur W. Patrick and
Harry M. Turpin.
By Edward C. Gritzbaugh
Atty.

Aug. 5, 1941.   W. W. PATRICK ET AL   2,251,341
MOLDBOARD FOR PLOWS AND METHOD OF MAKING SAME
Filed Jan. 14, 1939    2 Sheets-Sheet 2
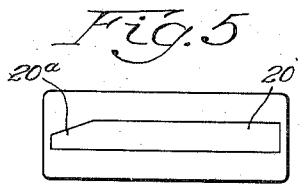
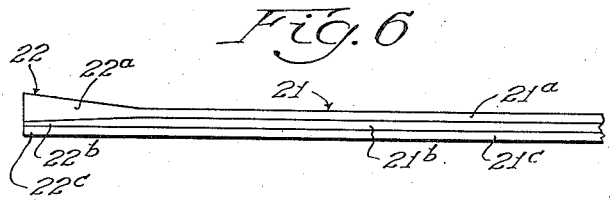
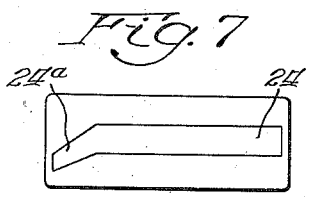
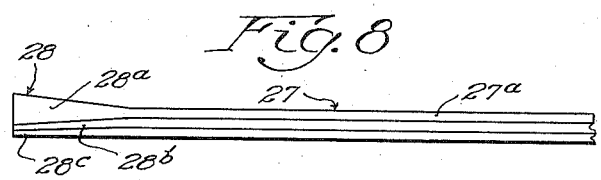
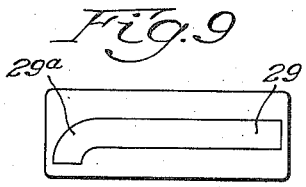
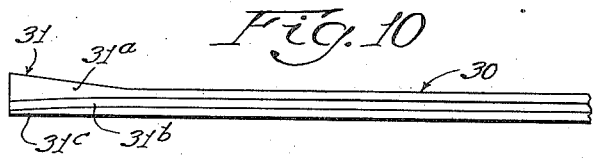
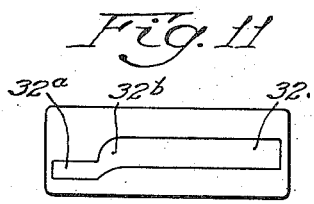
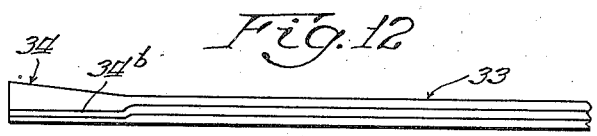
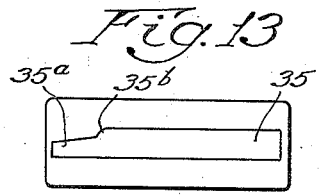
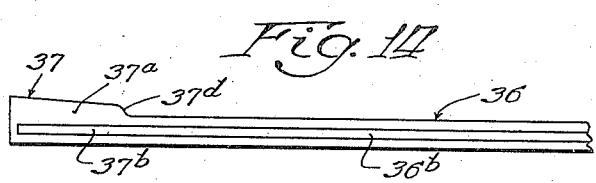
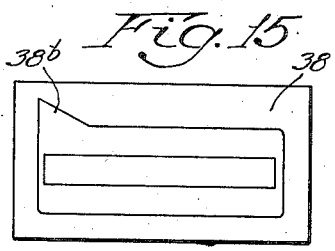
Inventors:
Wilbur W. Patrick and
Harry M. Turpin.
By Edward C. Gritzbaugh
Atty.

Patented Aug. 5, 1941

2,251,341

UNITED STATES PATENT OFFICE 2,251,341

MOLDBOARD FOR PLOWS AND METHOD OF MAKING SAME

Willbur W. Patrick and Harry M. Turpin, New Castle, Ind., assignors to Borg-Warner Corporation, Chicago, Ill., a corporation of Illinois Application January 14, 1939, Serial No. 250,948

1 Claim. (Cl. 29—14)

This invention relates to the fabrication of earth engaging or earth working tools wherein certain areas of the tool are subject to greater wear than other areas and has particularly to do with an improved method of fabricating the earth engaging portions of a plow including the mold board and the share.

An attempt has heretofore been made to solve the problem of excess wear adjacent the forward portion of a plow mold board, for example, by welding thereto what is known in the art as a "shin patch," or by still another practice, known as "upsetting." The shin patch technique has, among other disadvantages, that of requiring great care and skill on the part of the person doing the welding and in the absence of such extreme care, a large number of miswelds result. It is necessary to heat the point of the mold board and the shin patch to such a very high temperature as to result in a coarse grain in the high carbon layers which tends to make the structure brittle. Still another objection to welding is the fact that the welded joint must be polished, which is both time-consuming and expensive. As a result of the above, a high percentage of the mold boards must be rejected because of cracks which develop in the shin patch after the heat-treating and polishing operation. The latter technique of upsetting or forging has, among other disadvantages, the fact that in the upsetting operation, the inner plate often buckles or curls. The upsetting method has the further objection that the layers do not always upset uniformly. Generally the central layers will buckle and produce thin spots in the outer layer. These thin spots will, of course, wear through very quickly in service and necessitate the replacement of the part which naturally means a dissatisfied customer.

This invention has as its object the provision of an improved method of fabricating laminated metal earth working tool blanks composed of a soft metal inner portion and a high carbon steel outer portion. It is a more particular object to provide an improved technique for fabricating an earth working tool of the above type adjacent the area of greatest wear with additional thickness of high carbon content steel by including a novel rolling step.

It is an object to provide a novel disposition in the mold of the soft metal inner plate whereby to provide a greater relative thickness of at least one of the high carbon content layers at one portion of the resulting ingot than at another, the ingot then being rolled to produce a sheet from which an earth working tool may be cut, the portion of greatest wear being cut from the portion having the greater percentage of high carbon content steel. It is a more particular object to provide an improved technique for accomplishing the above result having special application to the fabrication of mold boards and plow shares.

Other and more particular objects, uses and advantages of our invention will become apparent from a reading of the following detailed specification taken in connection with the accompanying drawings forming a part thereof and wherein:

Fig. 1 is a plan view showing a mold containing an ingot cast in accordance with one embodiment of our invention;

Fig. 2 is a view showing a sheet of laminated metal in a state of completion between a pair of flattening rolls, one of which is formed with a groove or offset in accordance with a preferred embodiment of our invention;

Fig. 3 is a perspective like view of the completed sheet with a plow mold board marked off thereon;

Fig. 4 is a perspective like view of the plow mold board cut from the sheet shown in Fig. 3;

Fig. 5 is a view corresponding to Fig. 1 showing an ingot having a modified form of soft metal inner plate cast therein;

Fig. 6 is an end view of the plate after the rolling operation, indicated in Fig. 2, has been completed, starting with the ingot shown in Fig. 5;

Figs. 7 through 12 are further modifications corresponding to Figs. 5 and 6 respectively;

Fig. 13 is a modification corresponding to Fig. 1 and showing a form and arrangement of center plate and the initial ingot peculiarly suitable for rolling the plate shown in Fig. 14 from which plow share blanks are subsequently cut; and Fig. 15 shows a modification of the mold shown in Fig. 1.

In the art of manufacturing laminated metal sheets from which earth working tool blanks such as plow mold board blanks and plow share blanks are subsequently cut, we have found that the optimum disposition of the metal of the soft inner plate and the metal of the high carbon content outer plates can be obtained by careful control of certain important factors. The first important factor we have found to be the shape and positioning of the soft metal plate in the mold prior to pouring the high carbon content steel thereabout. Certain optimum shapes of center plate as well as the particular disposition of the center plate in the mold are found to produce the desired results as will appear. Secondly, we have discovered that the desired results with respect to the final distribution of the metals forming the different layers may be obtained by a novel method of rolling the ingot to produce a plate thicker at one portion thereof than in the remaining portions and cutting the tool blanks, be they mold board blanks, plow share blanks or other tool blanks, from this plate with the area of maximum wear cut from the thicker portion of the plate.

Referring more specifically to the figures of the drawings, one preferred embodiment of our invention is indicated in Figs. 1 to 4 wherein the process comprises first supporting a soft metal center plate 10 of uniform cross-section in a rectangular mold 11 of uniform cross-section and pouring high carbon content steel 12 thereabout. The resulting ingot is next passed between forming rolls 13 and 14 to produce a plate of the desired thickness from which the tool blanks are subsequently to be cut. Roll 13 is formed with an offset or groove portion 15 which results in producing a plate indicated generally at 16 having a main body portion 17 of uniform thickness and a flared or enlarged edge portion 18. In this particular modification it will be seen that plate 17 is composed of an upper outer layer of high carbon content steel 17a, a central soft metal layer 17b and a lower outer high carbon content steel layer 17c, while edge portion 18 is composed of an upper outer high carbon content steel layer 18a, increasing in thickness from the point where it joins with layer 17a to the peripheral edge of plate 16, and layers 18b and 18c corresponding to 17b and 17c and likewise increasing in thickness in the direction of the edge of plate 16.

Following the above rolling operation, mold board blanks 19 are laid out on plate 16 with the portion 19a, which in normal use will be subject to the greatest wear laid out to be cut from portion 18 of plate 16. This, as it will readily appear, will provide for an increased amount of thickness of high carbon content steel 18a to take the greatest wear.

While we have shown in Fig. 1 the soft metal inner plate disposed centrally with respect to the mold which results after rolling in plates 17a, 17b and 17c being of substantially the same thickness and also in edge poritions 18a, 18b and 18c likewise being of substantially the same thickness, it is apparent that soft metal center plate 10 may be disposed to one side of the mold whereby to make portions 17a and 18a relatively thicker than the remaining layers.

While we have shown the enlarged edge 18 of plate 16 produced by a specially formed upper roll having a groove or offset portion 15 therein, and consider this to be a novel arrangement, we also contemplate as being within the broad scope of our invention the rolling of this edge 18 in what are known in the art as "gap rolls." Broadly, this consists in first reducing the total thickness of the plate to about the maximum thickness of the portion 18 of plate 16, next cutting the tool blank therefrom and following this with a reducing operation between a pair of flattening rolls by repeatedly inserting the tool blank 19 therebetween and rolling the blank down to produce the relatively thinner body portion 19b.

It will of course be further understood that while we have indicated only two rolls 13 and 14 in Fig. 2, this is intended to represent as well a series of successive rolls 13 and 14 spaced increasingly closer together.

Referring now in greater detail to Figs. 5 through 12, we have shown a number of different forms or shapes of center plates molded in the ingots. These different shapes of center plates result, when the ingot is rolled, in a particular relative thickness in the area of maximum wear respectively of the high carbon content steel outer layer and the soft metal inner layer.

In Fig. 5 the portion indicated 20a of center plate 20 is reduced in thickness with the result that when the plate indicated generally at 21 in Fig. 6 is produced by the rolling operation, the particular disposition of metals indicated at 22 is obtained. Specifically, there results a portion or layer 22a of high carbon content steel considerably thicker than corresponding portions 22b and 22c. The layers 21a, 21b and 21c remain the same relative thicknesses.

Referring to Figs. 7 and 8 the soft metal inner plate 24 is both reduced in thickness in the portion 24a thereof and also bent away from the side of the ingot that will eventually become the area subject to the greatest wear. When this ingot is rolled to produce the plate shown in Fig. 8, it will be seen that this plate will differ from the plate shown in Fig. 6 by the fact that portion 28a of high carbon content steel is considerably thicker than correspondingly portion 22a of the plate shown in Fig. 6. Portion 28b extends in a direction generally away from the median plane of the plate and becomes increasingly thinner as it approaches the edge of the plate. Portion 28c is formed complementarily to the inner plate and presents a flat surface on the lower side thereof. The layers composing the main body portion 27 remain unchanged from the preceding Fig. 6.

Referring to the modification shown in Figs. 9 and 10, it will be seen that the center plate 29 differs from the center plate 24 of Fig. 7 in that portion 29a is turned without changing the thickness thereof. The resulting body portion 30 of the plate after rolling remains the same as the preceding figures, while the enlarged end portion 31 differs principally in that the soft center plate portion 31b is curved away from portion 31a and in the direction of portion 31c as differentiated from being bent or turned at an abrupt angle as in Fig. 8.

Referring to the further modification shown in Figs. 11 and 12, the soft metal center plate 32 is shaped with an offset reduced portion 32a and a connecting portion 32b with the result that the main body portion 33, Fig. 12, remains substantially the same as in the preceding figures, while the enlarged end portion 34 differs from the preceding figures, principally in the fact that portion 34b is displaced further away from the upper surface which will later become in the finished tool, the surface of greatest wear and more nearly parallel to the opposite surface.

Referring specifically to the modification of Figs. 13 and 14, we have shown a particular initial shape of soft center plate 35 including converging end portion 35a joined by shoulder portion 35b which, when rolled, will produce the shape of plate shown in Fig. 14. This will result in body portion 36 being substantially unchanged from the preceding figures, while portion 37 is of a particular shape and increased thickness adaptable for plow shares as differentiated from mold boards. It will be noted that soft metal center plate 37b does not extend to the edge and that the same is substantially of the same thickness as portion 36b, while portion 37a is formed with a decided shoulder 37d necessary in the subsequent fabrication of plow shares from said plate.

Referring to Fig. 15 we have shown an alternate method of securing the increased thickness of high carbon content steel in the area of maximum wear including forming the mold 38 with a recess 38b providing for an increased thickness of high carbon content steel at this point.

It will of course be understood that the rolls in which the plate of Fig. 14 is formed will be constructed with special reference to the resulting shape desired, and this is likewise true of the plate to be formed from the ingot disclosed in Fig. 15.

We consider the rolling of a plate from which tool blanks are to be subsequently cut wherein the plate is formed with an enlarged or increased thickness adjacent the area out of which the portion of the tool subject to the greatest wear is to be cut, to constitute particular novel part of our invention. However, it is to be understood that we also consider as an important part of our invention the particular novel shapes and disposition of center plates in the molds as shown and described.

From the above it will appear that we have disclosed broadly certain new and improved methods by which an increased relative quantity of high carbon content steel is made available adjacent the area of greatest wear. We have further disclosed a number of specific modifications illustrating how the above disclosed broad concept may be applied in practice.

We are aware that many other applications of our invention coming within the scope of the above broad disclosure may be practiced without departing from the spirit of our invention and hence we wish the same to be limited only as indicated in the appended claim, which should be construed as broadly as the prior art will permit.

We claim:

The method of forming laminated sheet metal for earth working tools which comprises forming a blank of soft steel, offsetting and reducing the thickness of one edge of the soft steel blank, pouring molten high carbon steel around the blank to form a soft center ingot, and reducing the thickness of the ingot and increasing its length by rolling unequally, the greatest thickness of the ingots when rolled being located at the region where the blank is offset.

WILLBUR W. PATRICK.
HARRY M. TURPIN.